United States Patent [19]

Khuat

[11] Patent Number: 5,133,006
[45] Date of Patent: Jul. 21, 1992

[54] COMBINATION INTERFACE CIRCUIT FOR COUPLING A DIGITAL LOOP CARRIER TELEPHONE SYSTEM

[75] Inventor: Chuck D. Khuat, Tulsa

[73] Assignee: Seiscor Technologies Inc., Tulsa, Okla.

[21] Appl. No.: 606,380

[22] Filed: Oct. 31, 1990

[51] Int. Cl.[5] .............................................. H04M 1/00
[52] U.S. Cl. ................................... 379/399; 370/110.1
[58] Field of Search ............... 370/110.1, 53; 379/399, 379/366; 340/310 R; 324/547, 548; 455/600

[56] References Cited

U.S. PATENT DOCUMENTS

| | | | |
|---|---|---|---|
| 3,627,952 | 12/1971 | Person | 379/399 |
| 4,479,033 | 10/1984 | Brown et al. | 379/66 |
| 4,550,404 | 10/1985 | Chodrow et al. | 370/110.1 |
| 4,656,350 | 4/1987 | Faugeras et al. | 455/600 |

Primary Examiner—Douglas W. Olms
Assistant Examiner—Shick Hom
Attorney, Agent, or Firm—Richard M. Sharkansky

[57] ABSTRACT

A telephone interface circuit for use in a digital loop carrier system. A transformer for coupling analog information and a switch responsive to a hook condition signal is provided. The hook condition signal provides an indication of the "on/off hook" condition of a corresponding telephone subscriber. The switch provides a closed circuit condition to "sink" a DC current when the corresponding telephone subscriber is "off hook" and an open circuit condition when the corresponding subscriber is "on hook". The telephone interface circuit further includes a capacitor serially coupled with the primary winding of the transformer, to prevent DC current from passing through the primary winding of the transformer. A combination telephone interface circuit that can be adapted for use as a remote terminal interface circuit or as a central office terminal interface circuit is also included. The combination interface circuit includes first and second circuit paths disposed in parallel with each other. The first circuit path includes a transformer, switch, and capacitor as described above. The second circuit path includes a subscriber line interface circuit. The combination interface circuit includes jumper wires for selectively coupling either the first circuit path or the second circuit path between a pair of input terimnals and a pair of output terminals of the combination interface circuit.

18 Claims, 4 Drawing Sheets

COMBINATION INTERFACE CIRCUIT FOR COUPLING A DIGITAL LOOP CARRIER TELEPHONE SYSTEM

BACKGROUND OF THE INVENTION

This invention relates generally to telephone communication systems and more particularly to interface circuits for use in telephone communication systems.

As it is known in the art, telephone communication systems generally include a plurality of remote users, or telephone subscribers, and a central office. The central office has a plurality of pairs of terminals, generally referred to as tip/ring terminals, with each pair coupled to a corresponding one of the plurality of subscribers. The central office electrically routes one of the plurality of subscribers (i.e. the "calling" subscriber) to another one of the plurality of subscribers (i.e. the "called" subscriber) so that analog voice and/or digital data information may pass therebetween. Specifically, the central office electrically connects the pair of tip/ring terminals coupled to the "calling" subscriber to the pair of tip/ring terminals coupled to the "called" subscriber.

More particularly, the central office provides a direct current (DC) voltage source, typically having a level of −48 volts, coupled to each of the pairs of central office tip/ring terminals, and thus to the one of the plurality of subscribers coupled thereto. The DC voltage is used to power circuitry within the telephone when analog voice and/or digital data information is transmitted or received. When a subscriber, or more specifically a telephone receiver, is "on hook", an open circuit condition exists and current is prevented from flowing from the DC voltage source through the telephone. When the telephone receiver goes "off hook", for example when the subscriber places a call, a closed circuit condition is provided and a DC current flows from the DC voltage source through the telephone (i.e. the telephone "sinks" a DC current). This DC "sinking" action is sensed at the central office and appropriate action is taken, for example the central office sends such subscriber a "dial tone" signal. The "calling" subscriber then enters the telephone number of a selected, "called" subscriber and in response to such dialing information, the central office "rings" the telephone of the "called" subscriber by providing a 20 Hertz AC "ring" voltage from a "ring" voltage source, superimposed on a DC voltage also provided by such "ring" voltage source, to the "called" subscriber. If the corresponding subscriber is "off hook", then the central office will not apply the 20 Hz AC "ring" voltage to the telephone of the corresponding subscriber and the central office will send a "busy signal" to the "calling" subscriber. If the "called" subscriber is "on hook", then the 20 Hz AC "ring" voltage "rings" the telephone of such subscriber. If the "called" subscriber responds to the "ring" and goes "off hook", a closed circuit condition is provided and the "called" telephone "sinks" DC current and AC current from the "ring" voltage source provided by the central office at the pair of central office tip/ring terminals coupled thereto. The central office senses this "off hook" condition, or the DC current "sinking", occurring in the "called" subscriber, and electrically decouples the "ring" voltage source from the tip/ring terminals and couples the DC voltage source to such subscriber. The central office also couples together the central office tip/ring terminals coupled to the "calling" and "called" subscribers, so that information may pass therebetween.

Often, when the subscribers are located at a relatively long distance away from the central office, for example greater than approximately 200 miles, the telephone communication system uses a digital loop carrier system which provides an interface between the central office and the subscribers. The digital loop carrier system generally includes a pair of switching systems coupled together via a high speed digital transmission line. One of the pair of switching systems is located near the subscribers, and may be referred to as the remote terminal switching system, and the other switching system is located near the central office, and may be referred to as the central office terminal switching system. Each of the switching systems provides time division multiplexing and demultiplexing, such that, depending on whether information is being transmitted from one of the subscribers to the central office or from the central office to one of the subscribers, one of the switching systems provides time division multiplexing while the other provides time division demultiplexing. With such an arrangement, the digital loop carrier system effectively localizes the central office to the town and is transparent to both the central office and subscribers.

More particularly, each one of the plurality of subscribers includes a pair of terminals, also generally referred to as the tip/ring terminals, coupled to the remote terminal switching system through a corresponding one of a plurality of remote terminal (RT) interface circuits. Similarly, each one of the pairs of central office tip/ring terminals is coupled to the central office terminal switching system through a corresponding one of a plurality of central office terminal (COT) interface circuits. In order for the digital loop carrier system to be transparent to the central office and to the subscribers, each of the COT interface circuits must appear to the central office as a telephone would appear (i.e. inter alia have the capability to "sink" a DC current when the corresponding subscriber is "off hook") and each of the RT interface circuits must appear to the corresponding subscriber as a central office (i.e. provide, inter alia, a nominal −48 volt DC source).

In a conventional COT interface circuit, serially disposed between the tip/ring terminals, are: the primary winding of a transformer, a capacitor in parallel with a resistor, and a relay. The secondary winding of the transformer is coupled to the central office terminal switching system through an analog to digital and digital to analog converter, or CODEC. Thus, the analog voice and/or digital data information is coupled between the tip/ring terminals of the COT interface circuit and the CODEC through the transformer by mutual inductive coupling between the primary and secondary windings. The transformer provides isolation to the CODEC so that it is not damaged by the flow of DC current. The relay is opened or closed selectively in response to a hook condition signal generated at the corresponding RT interface circuit and transmitted to the corresponding COT interface circuit through the remote terminal and central office terminal switching systems and the digital transmission line. The hook condition signal indicates to the COT interface circuit whether the corresponding subscriber is "on hook" or "off hook." When the corresponding subscriber is "off hook", the relay is closed, providing a closed circuit condition, to permit DC current "sinking" as referred to above. Here again, the central office senses this "off hook" condition, or the DC current "sinking" action, and appropriate action is taken. When such subscriber is "on hook", the relay is opened, providing the open circuit condition referred to above.

Since, as previously noted, the transformer couples analog voice and/or digital data information between the tip/ring terminals and the CODEC by mutual inductive coupling, it is desirable to operate the transformer in a non-saturated condition. It is also noted that, when the corresponding subscriber is in the "off hook" condition, the relay closes and current from the DC voltage source at the central office passes between the tip/ring terminals of the COT through the primary winding of the transformer and the serially connected resistor to permit the above described DC current "sinking" action. Thus, the DC current will tend to drive the transformer into saturation and thereby reduce its coupling effectiveness. One technique used to reduce the tendency of the transformer toward saturation, is to use a relatively large and expensive transformer, since the size of the transformer is related to the saturating flux density level and hence the DC current handling level of the transformer prior to saturation.

The relay used on a conventional COT interface circuit is generally referred to as the "hook relay", and has an additional resistor and capacitor disposed in series with each other and in parallel with the relay so that when the switch is open, as is the case when the corresponding subscriber is "on hook", information, for example from a computer and modem arrangement, is coupled through the capacitor and resistor. However, the AC transmission loss associated with the information coupled through the capacitor and resistor may cause signal distortion. This relay is generally a relatively large and expensive component.

As it is also known in the art, while the use of a digital loop carrier system eliminates the cost of providing a central office in small, remotely located towns having relatively few subscribers, networks using a digital loop carrier system require inventories of both RT interface circuits and COT interface circuits. To maintain both inventories is relatively expensive. Further, in certain applications, a subscriber may choose to have a private branch exchange (PBX) in place of an existing telephone. With a PBX, it is necessary that the functionality of the corresponding RT and COT interface circuits be reversed. That is, because a PBX requires central office terminal functionality where remote terminal functionality was provided for telephone subscribers, corresponding interface circuits associated with a PBX would require interchanging. Thus, when a change is desired, a service technician is required to travel to the location of the remote terminal interface circuit to make the interchange.

SUMMARY OF THE INVENTION

In accordance with the present invention, a telephone communication interface circuit has a first pair and a second pair of terminals. A transformer having a primary winding and a secondary winding, with the secondary winding being coupled to the second pair of terminals is also included. The telephone communication interface circuit further includes a switch coupled in parallel with the primary winding of the transformer and responsive to a hook condition signal for providing a closed circuit between a first pair of terminals.

More specifically, a digital loop carrier system is coupled between a plurality of subscribers and a central office and includes a remote terminal multiplexer/demultiplexer switching system and a central office terminal multiplexer/demultiplexer switching system. The remote terminal and central office terminal multiplexer/demultiplexer switching systems are interconnected by a transmission line. A plurality of remote terminal interface circuits is provided, with each one corresponding to one of the plurality of subscribers, and being adapted for coupling between the subscriber and the remote terminal multiplexer/demultiplexer switching system. A plurality of central office terminal interface circuits is also provided, each one corresponding to one of the plurality of subscribers, and having a first pair of terminals adapted for coupling to a DC voltage source provided at the central office and a second pair of terminals adapted for coupling to the central office terminal multiplexer/demultiplexer switching system. Each one of the plurality of central office terminal interface circuits includes a transformer, having a primary winding and a secondary winding, such secondary winding being coupled to the second pair of terminals through a CODEC. Also provided in each of the COT interface circuits are: a switch responsive to a hook condition signal, such signal providing an indication of the "on/off hook" condition of the corresponding subscriber, such switch being disposed between said first pair of terminals, for providing a closed circuit between the first pair of terminals to "sink" DC current provided by the DC voltage source when the hook condition signal indicates an "off hook" condition in the corresponding subscriber. Means, serially coupled with the primary winding between the first pair of terminals, prevents DC current provided by the DC voltage source from passing through the primary winding of the transformer.

With such an arrangement, a digital loop carrier system is provided wherein each one of the central office terminal interface circuits has a switch for directing, or "sinking", a DC current when the subscriber associated therewith is in an "off hook" condition and means for preventing such current from passing through the primary winding of the transformer. This arrangement permits the use of smaller, less expensive transformers by reducing the tendency of the transformer toward saturation. In a preferred embodiment of the invention, the DC current preventing means includes a capacitor. Further, because of the arrangement of the switch, a solid state, preferably optoelectronic switch, may be used in place of the relatively large and expensive relay. Therefore, the COT interface circuit is relatively inexpensive.

In accordance with a further aspect of the present invention, a telephone communication interface circuit is configurable for use as a central office terminal interface circuit or as a remote terminal interface circuit and includes a first pair of terminals, a second pair of terminals, and a third pair of terminals, with the third pair of terminals being coupled to the second pair of terminals through a CODEC. A first circuit path includes a transformer having a primary winding and a secondary winding, a switch responsive to a hook condition signal for providing a closed circuit between the first pair of terminals, and a capacitor serially coupled with the primary winding for preventing DC current from passing through the primary winding. A second circuit path comprises a subscriber line interface circuit. The telephone communication interface circuit further includes jumpers to selectively couple either the first circuit path between the first and third pairs of terminals or the second circuit path between the first and third pairs of terminals.

More specifically, the first pair of terminals is adapted for coupling to a DC voltage source provided at a central office when the circuit is configured as a central office terminal interface circuit and is adapted of coupling to a subscriber when the circuit is configured as a remote terminal interface circuit. The second pair of terminals is adapted for coupling to a central office terminal multiplexer/demultiplexer switching system when the circuit is configured as a central office terminal interface circuit and is adapted for coupling to a remote terminal multiplexer/demultiplexer switching system when the circuit is configured as a remote terminal interface circuit. The third pair of terminals is coupled to the second pair of terminals through the CODEC. The first circuit path includes: a transformer, having a primary and a secondary winding, and switch means, responsive to a hook condition signal and disposed between the first pair of terminals, for providing a closed DC circuit between the first pair of terminals to "sink" DC current provided by the DC voltage source when the signal indicates an "off hook" condition in the corresponding subscriber. The first circuit path further includes means, serially coupled with the primary winding between the first pair of terminals, for preventing DC current provided by the DC voltage source from passing through the primary winding. The interface circuit has a second circuit path which includes a subscriber line interface circuit (SLIC), such second circuit path being disposed in parallel with the first circuit path. The telephone interface circuit further comprises means for selectively coupling either the first circuit path between the first and third pairs of terminals when the telephone interface circuit is configured as a central office terminal interface circuit or the second circuit path between the first and third pairs of terminals when the telephone interface circuit is configured as a remote terminal interface circuit.

With such an arrangement, a telephone interface circuit is provided which is configurable as either a central office terminal interface circuit or as a remote terminal interface circuit. Such a configurable interface circuit reduces the inventory of interface circuits which must be stocked and maintained for operators of telephone communication systems using a digital loop carrier system since a common circuit may be configured as a COT or RT interface circuit.

BRIEF DESCRIPTION OF THE DRAWINGS

The foregoing features of this invention, as well as the invention itself, may be more fully understood from the following detailed description of, the drawings in which.

DESCRIPTION OF THE PREFERRED EMBODIMENTS

Figure 1A:
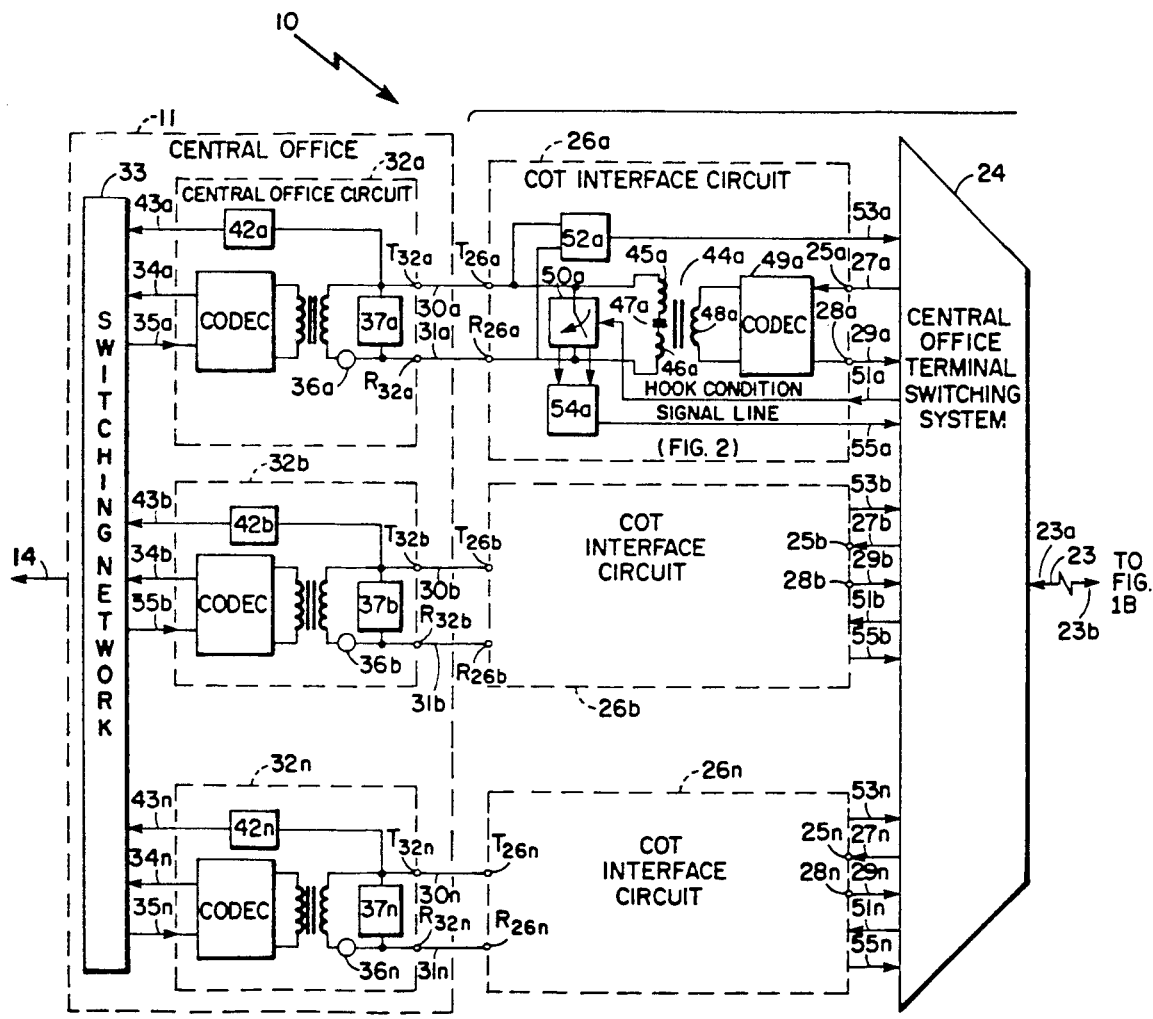
FIGS. 1A and 1B combined to provide a somewhat simplified block diagram of a telephone communication system in accordance with the present invention.

In accordance with the present invention, a telephone communication system 10 includes a central office 11, a digital loop carrier system 12, and a plurality of remote users, or subscribers 13a-13n. Telephone communication system 10 electrically couples one of the plurality of subscribers 13a-13n, or a "calling" subscriber, to another one of the plurality of subscribers 13a-13n, or a "called" subscriber, through the digital loop carrier system 12 and central office 11. Further, central office 11 is coupled, via signal line 14, to one or more different central offices (not shown) so that one of the plurality of subscribers 13a-13n can be coupled to another subscriber in another telephone communication system (not shown). The electrical coupling provided between on of the plurality of subscribers 13a-13n and another one of the plurality of subscribers 13a-13n allows analog voice and/or digital data information to be exchanged between such subscribers 13a-13n. Here, each of the plurality of subscribers 13a-13n is shown to be a telephone; however, in certain applications it may be desirable to replace any one of the telephone subscribers 13a-13n with a private branch exchange (PBX).

The digital loop carrier system 12 includes a plurality of remote terminal (RT) interface circuits 15a-15n, with each of such circuits 15a-15n corresponding to one of the plurality of subscribers 13a-13n. Each one of the plurality of RT interface circuits 15a-15n is located in close proximity to the corresponding one of the plurality of subscribers 13a-13n and has a pair of tip/ring terminals $T_{15a}, R_{15n}, R_{15n}$, respectively, coupled directly to the corresponding subscriber 13a-13n via signal line pairs 16a, 17a-16n,17n, respectively, and more particularly to a pair of tip/ring terminals $T_{13a}, R_{13a}-T_{13n}, R_{13n}$, respectively, of the corresponding one of the plurality of subscribers 13a-13n. A second pair of terminals 18a,19a-18n,19n of each of the plurality of RT interface circuits 15a-15n, respectively, is coupled to a remote terminal multiplexer/demultiplexer switching system 20 of digital loop carrier system 12 via signal line pairs 21a,22a-21n,22n, respectively. Switching system 20 is located relatively close to the plurality of subscribers 13a-13n and is further coupled to one end of a high speed digital transmission line 23. The digital loop carrier system 12 also includes a central office terminal multiplexer/demultiplexer switching system 24 located relatively close to central office 11 and coupled to another end of high speed digital transmission line 23. Remote terminal switching system 20 and central office terminal switching system 24 are arranged so that, at a given time, one of the switching systems provides multiplexing while the other provides demultiplexing.

For example, in operation, when information is being transmitted from one of the plurality of subscribers 13a-13n to the central office 11, remote terminal switching system 20 time division multiplexes the information provided by each of the plurality of subscribers 13a-13n by sequentially coupling each of the RT interface circuits 15a-15n to digital transmission line 23 to provide a single signal for transmission in a first direction indicated by arrow 23a over line 23. Central office terminal switching system 24 receives the signal transmitted via line 23 and time division demultiplexes the signal to recover the individual information provided by each one of the plurality of subscribers 13a-13n and transmit such information to central office 11. Conversely, when information flows from the central office 11 to the subscribers 13a-13n, central office terminal switching system 24 multiplexes such information to provide a single signal for transmission over line 23 in a second, opposite direction indicated by arrow 23b while remote terminal switching system 20 demultiplexes such information. More particularly, when information is being transmitted from on of the plurality of subscribers 13a-13n to central office 11, central office terminal switching system 24 provides such demultiplexed information to terminals 25a-25n of a plurality of central office terminal (COT) interface circuits 26a-26n, respectively, via signal lines 27a-27n, respectively, as shown. When information is transmitted from central office 11 to one of the plurality of subscribers 13a-13n, such information is provided to central office terminal switching system 24 via terminals 28a-28n of COT interface circuits 26a-26n via signal lines 29a-29n, respectively, as shown. Each of COT interface circuits 26a-26n has a pair of tip/ring terminals $T_{26}a,R_{26}a-T_{26}n, R_{26}n$, respectively, coupled to central office 11 via signal line pairs $30a31a-30n31_n$, respectively, as shown. In particular, COT tip/ring terminals $T_{26}a,R_{26}a-T_{26}n,R_{26}n$ are coupled to a corresponding one of a plurality of central office circuits 32a-32n, respectively, as shown. Thus, each one of the plurality of subscribers 13a-13n has a corresponding, dedicated RT interface circuit 15a-15n, COT interface circuit 26a-26n, and central office circuit 32a-32n.

Each of the central office circuits 32a-32n has a pair of tip/ring terminals $T_{32}a,R_{32}a-T_{32}n,R_{32}n$, respectively, which are electrically coupled to the tip/ring terminals $T_{26}a,R_{26}a-T_{26}n, R_{26}n$, respectively, of the corresponding one of the plurality of COT interface circuits 26a-26n via signal line pairs $30a31a-30n31_n$, respectively, as shown. Central office circuits 32a-32n are coupled to a switching network 33 via signal line pairs 34a,35a-34n,35n, respectively. The switching network 33 couples the "calling" one of the plurality of subscribers 13a-13n to the "called" one of the plurality of subscribers 13a-13n.

Here, the digital loop carrier system 12 is a conventional time division multiplexing (TDM) system using $T_1$ format encoding techniques. Thus, the information carried by digital transmission line 23 is quantized into eight bits, and the time period during which each of the plurality of remote terminal interface circuits 15a-15n is sampled to provide the single signal for transmission (i.e. when information is being transmitted from one of the plurality of subscribers 13a-13n to the central office 11) is referred to as a frame. In accordance with $T_1$ format, signalling information is provided at the eighth bit, or signalling bit, of every sixth frame in a conventional manner.

Each of the plurality of remote terminal interface circuits 15a-15n localizes the functionality of the central office 11 with respect to the corresponding subscriber 13a-13n. Consider the case when a digital loop carrier system is not used and thus when the central office 11 is coupled directly to one of the plurality of subscribers 13a-13n. In this situation, the central office 11, and in particular central office circuits 32a-32n, provide DC voltage sources 36a-36n, each of such sources 36a-36n having a value between −36 and −52 volts, and nominally −48 volts, to the tip/ring terminals $T_{13}a,R_{13}a-T_{13}n,R_{13}n$, respectively, of the corresponding one of plurality of subscribers 13a-13n to power circuitry within the telephone. Further, each of central office circuits 32a-32n includes a "ring" voltage source 37a-37n to provide an AC "ring" voltage, which is superimposed on a DC voltage, to "ring" the telephone of the corresponding one of the plurality of subscribers 13a-13n. Central office circuits 32a-32n also allow analog voice and/or digital data information to be transmitted therethrough when one of the plurality of subscribers 13a-13n has been electrically coupled to another one of the plurality subscribers 13a-13n through central office switching network 33.

Figure 1B:
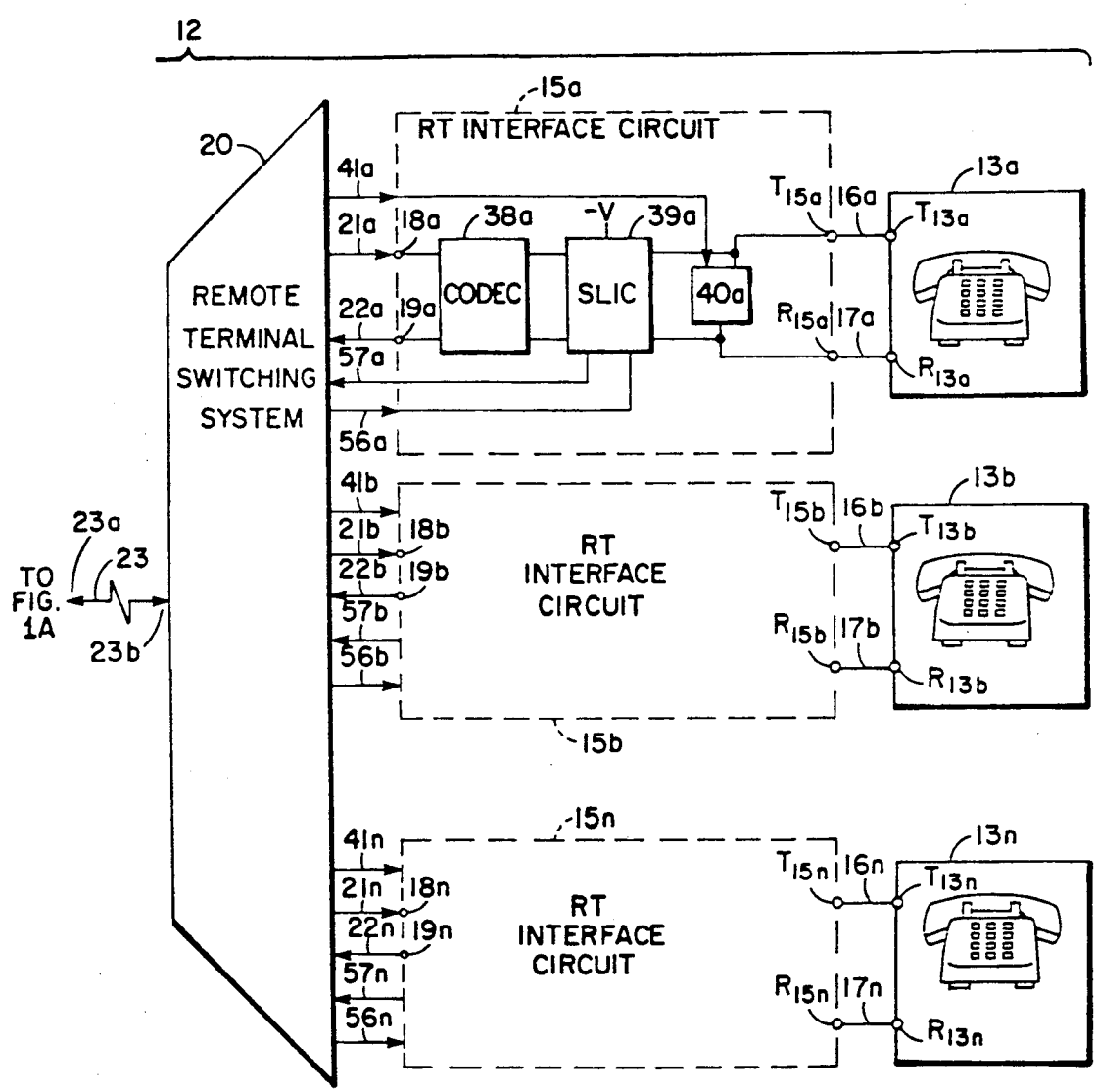

Similar to the central office 11 functionality described above for the case when a digital loop carrier system is not used, when, as in FIGS. 1A and 1B the central office 11 is coupled to the plurality of subscribers 13a-13n through a digital loop carrier system, here system 12, each one of the plurality of remote terminal (RT) interface circuits 15a-15n provides substantially the same functionality as the central office 11. In particular, each of the plurality of RT interface circuits 15a-15n provides a DC voltage source and a "ring" voltage source (equivalent to each one of the DC voltage sources 36a-36n and "ring" voltage sources 37a-37n, respectively, in the central office 11) to the corresponding one of the plurality of subscribers 13a-13n to power circuitry within the telephone.

More specifically, each one of the plurality of RT interface circuits 15a-15n is identical in construction; an exemplary one thereof, here RT interface circuit 15a, is shown to include a CODEC 38a and a serially connected subscriber line interface circuit (SLIC) 39a. Thus, referring to RT interface circuit 15a, a DC voltage source, of nominally −48 volts, is provided by voltage source (−V) coupled to and powering SLIC 39a disposed therein. Here, the SLIC 39a is Model PBL3764 manufactured and sold by Ericcson of Sweden. The DC voltage source (−V) powering SLIC 39a is coupled to tip/ring terminals $T_{15}a,R_{15}a$, of RT interface circuit 15a, such terminals being coupled to the tip/ring terminals $T_{13}a,R_{13}a$, of the corresponding subscriber 13a, respectively, as shown. Further, RT interface circuit 15a includes a "ring" voltage source 40a which provides an "ring" voltage (equivalent to the "ring" voltage provided by central office 11) superimposed on a DC voltage provided by such "ring" voltage source, to "ring" the telephone of the corresponding subscriber 13a. In particular, RT interface circuit 15a provides the AC "ring" voltage in response to a "ring" signal carried by signal line 41a. The "ring" signal corresponds to a "ring" control signal provided by the corresponding COT interface circuit 26a, as will be described. Similarly, the remaining plurality of RT interface circuits 15b-15n are each fed a "ring" signal carried by signal lines 41b-41n, respectively, such signals corresponding to "ring" control signals provided by the corresponding plurality of COT interface circuits 26b-26n as will be discussed below. Remote terminal interface circuits 15a-15n also allow analog voice and/or digital data information to be transmitted therethrough once the central office 11 has coupled one of the plurality of subscribers 13a-13n to another, selected one of the plurality of subscribers 13a-13n.

In particular, analog voice and/or digital data information is provided by one of the plurality of subscribers 13a-13n along the corresponding one of the signal line pairs 16a, 17a-16n,17n to the corresponding one of the plurality of RT interface circuits 15a-15n. Thus, considering, for example, RT interface circuit 15a, the information is transmitted through the subscriber line interface circuit (SLIC) 39a and is further processed by a coder/decoder or CODEC 38a to provide digital information at signal line pair 21a, 22a for transmission across line 23 to central office 11. CODEC 38a provides both analog to digital and digital to analog conversion depending on the direction of the information passing therethrough.

Conversely, each one of the plurality of central office terminal interface circuits 26a-26n localizes the functionality of the corresponding one of the plurality of subscribers 13a-13n with respect to the central office 11. In other words, COT interface circuits 26a-26n appear to the central office 11 as would the plurality of subscribers 13a-13n. As done above, consider again the case where a digital loop carrier system is not used and thus where the central office 11 is coupled directly to the plurality of subscribers 13a-13n. In this situation, when one of the plurality of subscribers 13a-13n is the "called" subscriber for example, an AC "ring" voltage superimposed on a DC voltage is provided across the tip/ring terminals $T_{13}a, R_{13}a-T_{13}n, R_{13}n$ thereof by the corresponding one of "ring" voltage sources 37a-37n of central office circuits 32a-32n, respectively, as shown. If the corresponding subscriber 13a-13n removes the telephone receiver in response to such "ring" voltage (i.e. goes "off hook", the corresponding subscriber 13a-13n provides a closed circuit condition to "sink", or in other words draw, both DC and AC current from the corresponding one of the plurality of "ring" voltage sources 37a-37n, respectively. However, once current flows through the telephone of the "called" one of the plurality of subscribers 13a-13n, the corresponding one of central office circuits 32a-32n detects the flow of DC current therethrough. In particular, a corresponding one of detection circuits 42a-42n detects the flow of DC current through the corresponding one of the plurality of subscribers 13a-13n and transmits such information to central office switch 33 via the corresponding one of signal lines 43a14 43n, respectively. In response to such DC current "sinking" information, central office switch 33 electrically decouples the corresponding one of "ring" voltage sources 37a-37n from the corresponding one of the plurality of subscribers 13a-13n and couples the corresponding one of the plurality of DC voltage sources 36a-36n to the corresponding one of the plurality of subscribers 13a-13n so that the corresponding one of the plurality of subscribers 13a-13n "sinks" DC current from the corresponding one of DC voltage sources 36a-36n. When one of the plurality of subscribers 13b-13n, for example, is electrically coupled to subscriber 13a, and hangs up the telephone 13b-13n, such information is provided to central office circuit 32a via central office switch 33. In response to this information, central office circuit 32a electrically disconnects DC voltage source 36a from corresponding subscriber 13a thereby disconnecting such subscriber 13a from its power source 36a and terminating the electrical connection between subscriber 13a and the electrically coupled one of subscribers 13b-13n. This feature is generally referred to as "forward disconnect" and ensures that when a subscriber has hung up after being electrically connected to another subscriber, the electrical coupling between the two is terminated.

In the case when, as in FIGS. 1A and 1B, the central office 11 and the plurality of subscribers 13a-13n are coupled together through a digital loop carrier system, here system 12, the functionality of the plurality of subscribers 13a-13n described above, is provided by the plurality of COT interface circuits 26a-26n. Hence, each of the plurality of COT interface circuits 26a-26n is adapted to receive an AC "ring" voltage superimposed on a DC voltage, at the tip/ring terminals $T_{26}a, R_{26}a-T_{26}n, R_{26}n$ thereof, from the corresponding one of the plurality of "ring" voltage sources 37a-37n of the corresponding central office circuit 32a-32n, respectively, coupled thereto via signal line pairs 30a,3-1a-30n, 31n, respectively as shown, when the corresponding one of the plurality of subscribers 13a-13n is the "called" subscriber. Further, COT interface circuits 26a-26n are adapted to "sink", or draw DC and AC, current from the one of the plurality of "ring" voltage sources 37a-37n, or to draw DC current from the one of the plurality of DC voltage sources 36a-36n provided by the corresponding one of the plurality of central office circuits 32a-32n depending on which of such sources is coupled thereto. More specifically, when one of the plurality of subscribers 13a-13n goes "off hook" in response to a "ring" voltage, the corresponding one of COT interface circuits 26a-26n will draw DC and AC current from the one of the plurality of "ring" voltage sources 37a-37n coupled thereto. Once the corresponding one of central office circuits 32a-32n detects a flow of DC current through the corresponding one of COT interface circuits 26a-26n, the corresponding one of "ring" voltage sources 37a-37n is electrically decoupled from signal line pairs 30a31a-30n31n, respectively, and the corresponding one of DC voltage sources 36a-36n is coupled thereto so that only a DC current is "sunk". Further, when one of the plurality of subscribers 13b-13n, for example, is electrically coupled to subscriber 13a, and hangs up, central office circuit 32a electrically disconnects DC voltage source 36a from COT interface circuit 26a. A DC current detection circuit 54a on COT interface circuit 26a detects the cessation of DC current flow and generates a signal indicating this condition which is carried by signal line 55a through switching systems 24, 20, digital transmission line 23, and signal line 56a to RT interface circuit 15a. In particular, signal line 56a feeds SLIC 39a of RT interface circuit 15a and in response to an indication that the other electrically coupled one of the plurality of subscribers 13b-13n has hung up, RT interface circuit 15a disconnects the DC voltage source (−V) from subscriber 13a thereby terminating the electrical coupling between such subscribers. Thus, the plurality of COT interface circuits 26a-26n localizes the functionality of the plurality of subscribers 13a-13n with respect to the central office 11 and the plurality of RT interface circuits 15a-15n localizes the functionality of the central office 11 with respect to the plurality of subscribers 13a-13n. In this way, the digital loop carrier system 12 is essentially transparent to both the central office 11 and the plurality of subscribers 13a-13n.

Each one of the COT interface circuits 26a-26n is identical in construction, an exemplary one thereof, here COT interface circuit 26a, is shown to include transformer 44a with the pair of primary windings 45a, 46a connected in series with a DC current blocking circuit (here capacitor 47a) disposed between the tip/ring terminals $T_{26}a, R_{26}a$, as shown. As will be described hereinafter, capacitor 47a prevents DC current from flowing through the primary windings 45a, 46a. The secondary winding 48a of transformer 44a is coupled to the pair of terminals 25a, 28a of COT interface circuit 26a through CODEC 49a. A switch or DC "sink" circuit 50a is coupled to hook condition signal line 51a, such line 51a carrying a hook condition signal providing an indication of the "on/off hook" condition of the corresponding subscriber, here telephone 13a. The hook condition signal corresponds to a hook condition control signal which is generated by SLIC 39a interface circuit 15a and carried by signal line 57a to remote terminal switching system 20 as shown. The hook condition control signal is transmitted across transmission line 23 and is provided by central office terminal switching system 24 to hook condition signal line 51a.

When the telephone 13a is "on hook", the hook condition signal carried by signal line 51a indicates such "on hook" condition and DC "sink" circuit 50a is provided in an open circuit condition. Thus, DC current from DC voltage source 36a or "ring" voltage source 37a is prevented from passing through DC "sink" circuit 50a by the open circuit condition and is prevented form passing through primary windings 345a, 46a by capacitor 47a. On the other hand, when telephone 13a is in an "off hook" condition, the hook condition signal carried by signal line 51a indicates such "off hook" information and DC "sink" circuit 50a is provided in a closed circuit condition to "sink" DC current. When DC current is drawn through DC "sink" circuit 50a, the central office 11 and more particularly central office circuit 32a, detects this "off hook" condition with DC current detection circuit 42a and responds accordingly, for example by sending a "dial tone" signal to subscriber 13a. As noted, DC current is prevented from passing through the primary windings 45a and 46a of transformer 44a by capacitor 47a and thus such current does not tend to saturate transformer 44a.

As previously mentioned, the secondary winding 48a of the transformer 44a is coupled to the pair of terminals 25a, 28a through CODEC 49a, such CODEC 49a converting analog voice information into digital information prior to transmission across the digital transmission line 23 and or alternatively converting the digital information transmitted across the transmission line 23 into analog information.

Figure 2:
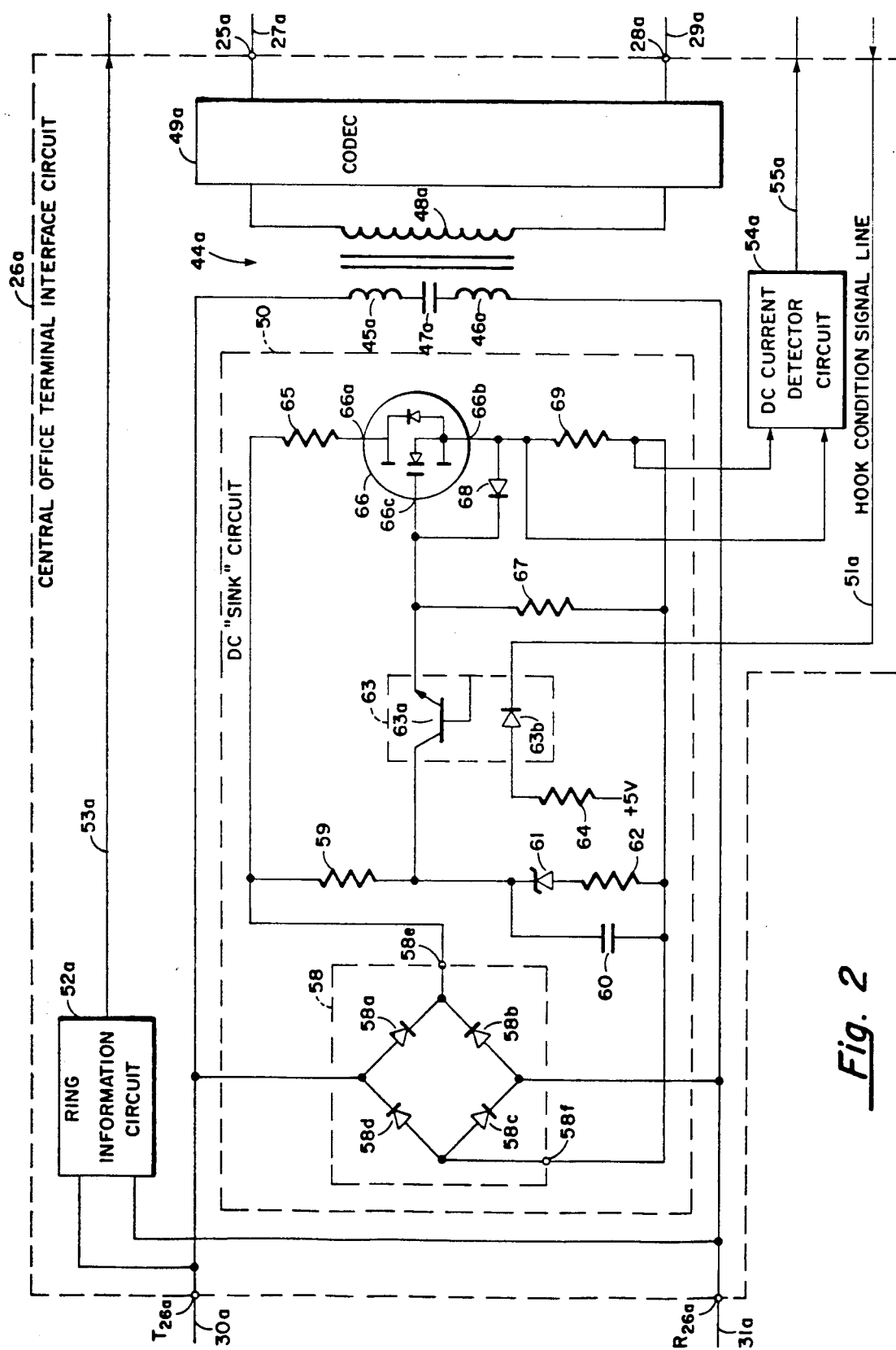
FIG. 2 is a schematic diagram of a central office terminal interface circuit used in the telephone communication system of FIGS. 1A and 1B.

Referring also to FIG. 2, an exemplary one of the plurality of COT interface circuits 26a-26n, here COT interface circuit 26a, is shown to include a switch, or DC "sink" circuit 50a, coupled between tip/ring terminals $T_{26a}$, $R_{26a}$ and transformer 44a. As previously mentioned, COT interface circuit 26a has the pair of tip/ring terminals $T_{26a}$, $R_{26a}$ adapted for coupling to the central office 11, and in particular to a corresponding central office circuit 32a via signal line pair 30a, 31a. Central office terminal interface circuit 26a further includes a pair of terminals 25a, 28a adapted for coupling to the central office terminal switching system 24 via signal line pair 27a, 29a. The DC "sink" circuit 50a is coupled to the primary windings 45a and 46a of transformer 44a, such primary windings 45a and 46a having a DC current blocking circuit, or capacitor 47a disposed in series therebetween. A secondary winding 48a of transformer 44a is coupled to CODEC 49a, such CODEC 49a being further coupled to terminals 25a, 28a of COT interface circuit 26a.

COT interface circuit 26a includes ring information circuit 52a and DC current detection circuit 54a. Ring information circuit 52a provides information to the corresponding remote terminal interface circuit 15a via central office terminal switching system 24, transmission line 23, and remote terminal switching system 20 (FIGS. 1A and 1B) by conventional bit signalling techniques. In particular, ring information circuit 52a has a pair of input terminals coupled to the tip/ring terminals $T_{26a}$, $R_{26a}$ of COT interface circuit 26a and an output terminal coupled to central office terminal switching system 24 via signal line 53a. DC current detection circuit 54a provides information to the corresponding remote terminal interface circuit 15a via signal line 55a in accordance with the "forward disconnect" feature described to above in conjunction with FIGS. 1A and 1B. In particular, a current detection signal, corresponding to that generated by circuit 54a and carried by signal line 55a, is fed to RT interface circuit 15a and carried by signal line 56a (FIGS. 1A and 1B) DC current detection circuit 54a has a pair of input terminals coupled to DC "sink" circuit 50a and an output terminal coupled to central office terminal switching system 24 via signal line 55a.

In operation, when subscriber 13a is "off hook" and "ring" voltage source 37a has been decoupled from the tip/ring terminals $T_{26a}$, $R_{26a}$ of COT interface circuit 26a, such terminals $T_{26a}$, $R_{26a}$ have a DC voltage provided thereon by a DC voltage source 36a (FIGS. 1A and 1B) disposed in the central office 11. In particular, the DC voltage source 36a is disposed in the corresponding central office circuit 32a, such DC voltage source 36a having a value between approximately $-36$ and $-52$ volts, and nominally $-48$ volts.

When the corresponding subscriber 13a makes a call (i.e. is the "calling" subscriber), and goes "off hook", such "off hook" information is provided by a hook condition signal to COT interface circuit 26a via signal line 51a by conventional signalling techniques. As previously described, the hook condition signal carried by signal line 51a corresponds to a hook condition control signal generated by RT interface circuit 15a and carried by signal line 57a. In particular, when subscriber 13a is the "calling" subscriber and picks up the telephone receiver, a logic "low" signal is provided on signal line 51a. Upon receipt of such "off hook" information, COT interface circuit 26a enables DC "sink" circuit 50a to draw a DC current from the voltage source 36a (FIGS. 1A and 1B) coupled to tip/ring terminals $T_{26a}, R_{26a}$ in a manner that will be described in detail hereinafter. Suffice it to say here however, that once DC current flows through "sink" circuit 50a, such DC current flow is detected by detection circuit 42a of central office circuit 32a. The current detection signal provided by circuit 42a provides an indication to central office switching network 33 of whether the corresponding subscriber 13a is "on hook" or "off hook". In response to the current detection signal indicating an "off hook" condition, for example, the central office circuit 32a responds by sending a "dial tone" signal to corresponding subscriber 13a. Then, in response to dialing information provided by the corresponding, "calling" subscriber 13a, central office 11 "rings" the telephone of a selected, "called" one of the plurality of subscribers 13a-13n by providing an "ring" voltage superimposed on a DC voltage to such "called" subscriber. Upon receipt by central office circuit 32a that the selected, "called" subscriber has gone "off hook", the central office 11 electrically couples the "called" and "calling" subscribers together and permits analog voice and/or digital data information to pass therebetween. More specifically, voice information, for example, is coupled from corresponding subscriber 13a to signal line pair 27a, 29a of COT interface circuit 26a. CODEC 49a converts the digitally transmitted voice information into analog voice information which is then coupled through transformer 44a to the tip/ring terminals $T_{26a}$, $R_{26a}$ of COT interface circuit 26a and to the corresponding central office circuit 32a via signal line pair 30a, 31a.

In the case when the corresponding subscriber 13a is the "called" subscriber, ring information circuit 52a, here including a comparator (not shown), receives ring information from the corresponding central office circuit 32a via signal line pair 30a, 31a and in response thereto, provides a "ring" control signal carried by signal line 53a, which is transmitted through central office terminal switching system 24, transmission line 23, remote switching system 20, to RT interface circuit 15a. A ring signal, corresponding to the ring control signal generated by circuit 52a, is fed to RT interface circuit 15a via signal line 41a. In response to the ring signal, which indicates that the corresponding subscriber 13a is the selected "called" subscriber, RT interface circuit 15a provides an AC "ring" voltage from "ring" voltage source 40a superimposed on a DC voltage provided by such source 40a to the corresponding subscriber 13a via signal line pair 16a, 17a (FIG. 1). If subscriber 13a goes "off hook" in response to the "ring", such "off hook" information is transmitted to COT interface circuit 26a. In particular, as previously mentioned, signal line 51a carries the hook condition signal to DC "sink" circuit 50a and, when the corresponding subscriber 13a is "off hook", causes DC current to flow through circuit 50a. Upon detection of this DC "sinking" or "off hook" information by DC current detection circuit 42a, central office circuit 32a allows analog voice and/or digital data action to pass between the "calling" and the "called" subscribers.

Thus, it is understood that in operation, regardless of whether the corresponding subscriber 13a is the "calling" subscriber or the "called" subscriber, when subscriber 13a is "off hook", the DC "sink" circuit 50a in the corresponding COT interface circuit 26a has a flow of DC current therethrough, such current flow occurring in response to the hook condition signal provided on signal line 51a.

More particularly, when the corresponding subscriber 13a goes "off hook", the hook condition signal is provided in a first, logic "low" state, via signal line 51a. The hook condition signal is coupled to the cathode of a diode 63b of an optoelectronic coupler device 63. The anode of diode 63b is coupled to a reference potential, here of approximately 5.0 volts via a resistor 64, here such resistor 64 having a value of approximately 348 ohms. In a logic "low" state, the hook condition signal forward biases diode 63b of optoelectronic coupler 63 device, thus biasing transistor 63a of optoelectronic coupler device 63 to a conducting state.

DC "sink" circuit 50a includes a diode bridge arrangement 58 comprising diodes 58a-58d. The diode bridge 58 permits operation of DC "sink" circuit 50a regardless of the polarity of the DC voltage source 36a coupled to the tip/ring terminals $T_{26a}$, $R_{26a}$. Resistors 59 and 62, here having values of approximately 340KΩ and 49.9KΩ, respectively, are arranged in a series connection between terminals 58e and 58f of diode bridge 58. A 4.3 volt Zener diode 61 is disposed between resistors 59 and 62. A capacitor 60, here having a value of approximately 15microfarads, is coupled in parallel with the series arrangement of resistor 62 and diode 61. Capacitor 60 provides an AC impedance which, at frequencies between 200 and 3400 Hz (such frequencies corresponding to the operational limits of the CODEC 49a) minimizes AC voltage drop, and therefore AC signal loss and distortion of analog voice and/or digital data information. Here, the AC transmission loss associated with DC "sink" circuit 50a is negligible.

Thus, assuming DC voltage source 36a provides approximately −48 volts at terminal $R_{26a}$ of interface circuit 26a, as is generally the case, DC current will flow from voltage source 36a through terminal $T_{26a}$, diode 58a, resistor 59, Zener diode 61, resistor 62, and terminal $R_{26a}$. However, until transistor 63a of optoelectronic coupler 63 is biased to a conducting state, DC current is inhibited from flowing through such transistor 63a.

The DC "sink" circuit 50a further includes a resistor 65, here having a value of approximately 348 ohms, in series with the drain 66a of a field effect transistor (FET) 66, the source 66b of such FET 66 being coupled through a resistor 69 to ring terminal $R_{26a}$. Here, resistor 69 has a value of approximately 100 ohms. The gate 66c of FET 66 is coupled to the emitter of transistor 63a of optoelectronic device 63. Diode 68 is disposed between the gate terminal 66c and the source terminal 66b of FET 66 in order to protect such FET 66 from excessive, damaging reverse voltage between the gate terminal 66c and the source 66b terminal. Resistor 67 is disposed between the gate terminal 66c of FET 66 and terminal 58f of diode bridge 58 and provides a discharge path for the gate terminal 66c to source terminal 66b capacitance of FET 66. The discharge path provided by resistor 67 is particularly important in order to minimize distortion of dialing pulses as well as the timing of such pulses.

When optoelectronic coupler 63, or more specifically transistor 63a of optocoupler 63, is in a conducting state, (i.e. the hook condition signal is provided in a logic "low" state), FET 66 is biased to a conducting state. With FET 66 in a conducting state, current flows from the tip terminal $T_{26a}$, through diode 58a, resistor 65, FET 66, resistor 69, and to ring terminal $R_{26a}$ via diode 58c.

Here, current detection circuit 54a is coupled across resistor 69. When current flows through resistor 69, a voltage drop across resistor 69 is sensed by such detection circuit 54a using a comparator (not shown) and the output thereof provides the current detection control signal, such signal being fed to the corresponding remote terminal interface circuit 15a via signal line 55a and the corresponding current detection signal carried by signal line 56a (FIGS. 1A and 1B).

When the hook condition signal provided on line 51a is in a second, logic "high" state, optoelectronic device 63 and FET 66 are in non-conducting states. More particularly, diode 63b of optoelectronic coupler 63 is in a non-conducting state and, thus transistor 63a of optoelectronic coupler 63 is in a non-conducting state. Thus, FET 66 is in a non-conducting state and current is inhibited from flowing through resistor 65, FET 66, and resistor 69 to provide DC "sinking" action.

As was noted above in conjunction with FIGS. 1A and 1B each one of the COT interface circuits 26a-26n is identical in construction, thus each one of the COT interface circuits 26b-26n likewise is fed a hook condition signal via signal lines 51b-51n. Further, each of COT interface circuits 26b-26n includes a ring information circuit identical to ring information circuit 52a (FIG. 2) and a DC current detection circuit identical to DC current detection circuit 54a (FIG. 2). Thus, the ring information circuits (not shown) in COT interface circuits 26b-26n are coupled to central office terminal switching system 24 through signal lines 53b-53n, respectively, as shown. Similarly, the DC current detection circuits (not shown) in COT interface circuits 26b-26n are coupled to central office terminal switching system 24, respectively, through signal lines 55b-55n, respectively, as shown.

As was also noted above in conjunction with FIGS. 1A and 1B, each one of the RT interface circuits 15a-15n is identical in construction. Thus, each one of the RT interface circuits 15a-15n likewise provides a hook condition control signal carried by signal lines 57a-57n for transmission to the corresponding one of the plurality of COT interface circuits 26a-26n. Further, each of RT interface circuits 15a-15n is fed a current detection signal via signal lines 56a-56n in accordance with the "forward disconnect" feature described in conjunction with FIGS. 1A and 1B.

Figure 3:
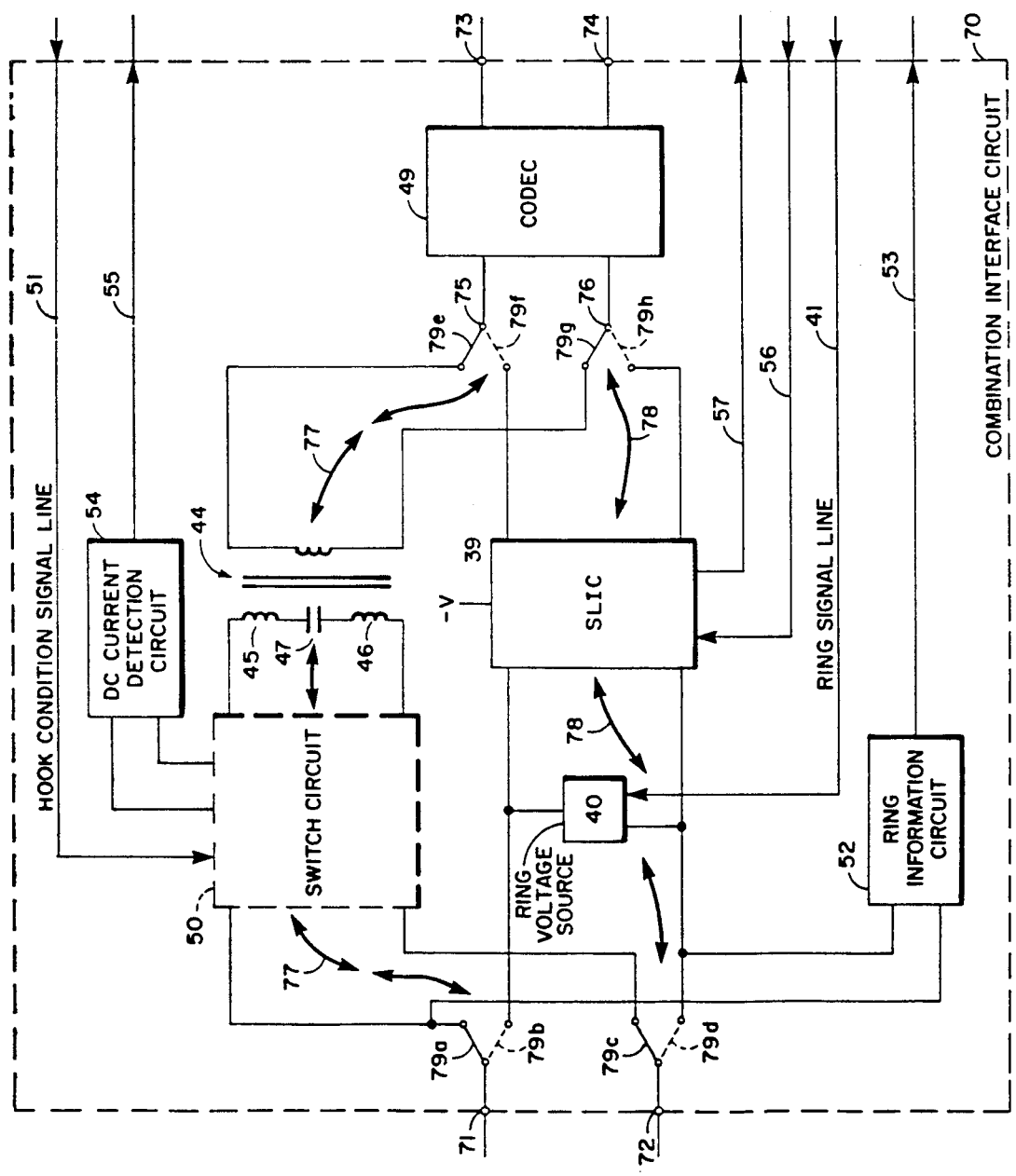
FIG. 3 is a schematic diagram of an interface circuit for use in the telephone communication system of FIGS. 1A and 1B in accordance with an alternate embodiment of the present invention.

Referring now to FIGS. 1 and 3, a telephone communication interface circuit 70, configurable for use as one of the plurality of COT interface circuits 26a-26n or as one of the plurality of RT interface circuits 15a-15n is shown. Such telephone communication interface circuit 70 is hereinafter sometimes referred to as a combination interface circuit 70. The combination interface circuit 70 includes a first pair of terminals 71, 72 adapted for coupling to central office 11 when the combination interface circuit 70 is configured as one of the plurality of COT interface circuits 26a-26n and adapted for coupling to a subscriber 13a-13n when such circuit 70 is configured as one of the plurality of RT interface circuits 15a-15n. The combination interface circuit 70 further includes a second pair of terminals 73, 74 adapted for coupling to a central office terminal multiplexer/demultiplexer switching system 24 when the combination interface circuit 70 is configured as one of the plurality of COT interface circuits 26a-26n and adapted for coupling to a remote terminal multiplexer/demultiplexer switching system 20 when such circuit 70 is configured as one of the plurality of RT interface circuits 15a-15n.

More particularly, when combination interface circuit 70 is configured as one of the plurality of a COT interface circuits 26a-26n (and replaces COT interface circuit 26a for example), terminals 71 and 72 are adapted for coupling to the corresponding central office circuit 32a via signal line pair 30a, 31a and terminals 73 and 74 are adapted for coupling to central office terminal switching system 24 via signal line pair 27a, 29a. When combination interface circuit 70 is configured as one of the plurality of RT interface circuits 15a-15n, and replaces RT interface circuit 15a for example, terminals 71 and 72 are adapted for coupling to the corresponding subscriber 13a via signal line pair 16a, 17a and terminals 73 and 74 are adapted for coupling to remote terminal switching system 20 via signal line pair 21a, 22a. A third pair of terminals 75, 76 is coupled to the second pair of terminals 73, 74 through a CODEC 49, as shown. The combination circuit 70 includes a first circuit path 77. First circuit path 77 includes a transformer 44, a switch circuit 50, here such switch circuit 50 being the same as DC "sink" circuit 50a (FIG. 2), and a capacitor 47. Capacitor 47 prevents DC current from passing through the primary winding (here the two serially connected primary windings 45, 46) of transformer 44. In other words, the first circuit path 77 includes substantially all of the circuitry of COT interface circuit 26a in FIG. 2 and operates as described above in conjunction therewith.

A second circuit path 78 includes a subscriber line interface circuit (SLIC) 39 and a "ring" voltage source 40. The second circuit path 78 is disposed in parallel with the first circuit path 77, as shown.

Combination interface circuit 70 further includes jumper wires 79a-79h, for selectively coupling, between the first and third pairs of terminals 71, 72 and 75, 76 respectively, either: (a) the first circuit path 77, (as when such combination circuit 70 is configured as one of the plurality of COT interface circuits 26a-26n); or, (b) the second circuit path 78, (when such combination circuit 70 is configured as one of the plurality of RT interface circuits 15a-15n).

More specifically, combination interface circuit 70 is configurable as either a COT interface circuit or an RT interface circuit by selectively including or excluding jumpers 79a-79h. When an application requires that combination interface circuit 70 be configured as a COT interface circuit, (i.e. when terminals 71, 72 are connected to terminals 75, 76 through path 77) the jumper wires that are included are as shown by solid lines in FIG. 3 (i.e. jumper wires 79a, 79c, 79e, and 79g are included). With such an arrangement, combination interface circuit 70 is configured to be substantially identical to COT interface circuit 26a of FIG. 2 and operates in the manner described in conjunction therewith. For example, consider that combination interface circuit 70 is configured to replace COT interface circuit 26a (FIGS. 1A and 1B) In this case, terminals 71 and 72 of combination circuit 70 are coupled to central office circuit 32a via signal line pair 30a, 31a and terminals 73 and 74 of combination circuit 70 are coupled to central office terminal switching system 24 via signal line pair 27a, 29a. Hook condition signal line 51 carries a signal indicating the "on/off hook" condition of the corresponding subscriber as described above. Ring information circuit 52 provides a "ring" control signal via signal line 53 to the corresponding RT interface circuit as described in conjunction with FIG. 2. DC current detection circuit 54 senses the flow of DC current through switch circuit 50 and provides an indication of whether current is being "sunk" by circuit 50 to the corresponding RT interface circuit 15a via signal line 55, in accordance with the "forward disconnect" feature as previously described.

When an application requires that combination interface circuit 70 be configured as an RT interface circuit, jumper wires 79b, 79d, 79f, and 79h (shown in dashed lines) are included and the remaining jumper wires 79a, 79c, 79e, and 79g are removed. Thus, terminals 71, 72 are connected to terminals 75, 76 through circuit path 78. Consider, for example, that RT configured combination interface circuit 70 is configured to replace RT interface circuit 15a (FIGS. 1A and 1B). In this case, terminals 71 and 72 of combination circuit 70 are coupled to corresponding subscriber 13a via signal line pair 16a, 17a and terminals 73 and 74 of combination circuit 70 are coupled to remote terminal switching system 20 via signal line pair 21a, 22a. A "ring" signal is carried by signal line 41 to "ring" voltage source 40 and causes such source 40 to be coupled to the corresponding subscriber 13a when it is desired to "ring" the telephone of such subscriber. Signal line 56 carries a signal that corresponds to the signal generated by DC current detection circuit 54 on the corresponding COT interface circuit and indicates whether the subscriber coupled to the corresponding subscriber has hung up in accordance with the "forward disconnect" feature. If such an indication is provided, the signal carried by signal line 56 causes the DC voltage source −V to be electrically decoupled from the corresponding subscriber and thereby terminate the electrical connection between the subscribers. Signal line 57 carries the hook condition control signal to the corresponding COT interface circuit, such signal indicating the "on/off hook" condition of the corresponding subscriber as previously described.

Having described preferred embodiments of the invention, it will now become apparent to one of skill in the art that other embodiments incorporating their concepts may be used. It is felt, therefore, that these embodiments should not be limited to disclosed embodiments but rather should be limited only by the spirit and scope of the appended claims.

What is claimed is:

1. A central office terminal interface circuit having a first pair of terminals adapted for coupling to a central office and a second pair of terminals adapted for coupling to a central office terminal multiplexer/demultiplexer switching system, said interface circuit comprising:
   (a) a transformer for coupling voice and/or data information between said central office and said central office terminal multiplexer/demultiplexer switching system, said transformer having a primary winding coupled to said first pair of terminals and a secondary winding coupled to said second pair of terminals; and
   (b) switch means, coupled in parallel with the primary winding of the transformer, for providing a closed circuit between said first pair of terminals to "sink" DC current from a DC voltage source disposed at said central office in response to a hook condition signal.

2. The interface circuit recited in claim 1 further comprising means, serially coupled with the primary winding of the transformer, for preventing DC current from passing through the primary winding.

3. The interface circuit recited in claim 2 wherein said DC current preventing means comprises a capacitor.

4. A central office terminal interface circuit for transmitting and receiving analog voice and/or digital data information between a central office and a subscriber, such interface circuit having a first pair of terminals adapted for coupling to said central office and a second pair of terminals adapted for coupling to a central office terminal multiplexer/demultiplexer switching system, said interface circuit comprising:
   (a) a transformer, having a primary winding coupled to said first pair of terminals and a secondary winding, said secondary winding being coupled to said second pair of terminals, for coupling voice and/or data information between the central office and the central office multiplexer/demultiplexer switching system;
   (b) switch means, responsive to a hook condition signal, such signal providing an indication of the "on/off hook" condition of the subscriber, such switch means being disposed in parallel with said primary winding, for providing a closed circuit between said the first pair of terminals to "sink" DC current provided by a DC voltage source disposed at the central office when said signal indicates an "off hook" condition in the subscriber; and
   (c) means, serially coupled with the primary winding between the first pair of terminals for preventing DC current provided by the DC voltage source disposed at the central office from passing through the primary winding.

5. The interface circuit recited in claim 4 wherein said DC current preventing means comprises a capacitor.

6. The interface circuit recited in claim 4 wherein said switch means includes an optoelectronic device.

7. The interface circuit recited in claim 4 wherein the switch means is disposed in parallel with said primary winding.

8. A digital loop carrier system coupled between a plurality of subscribers and a central office, such system including a remote terminal multiplexer/demultiplexer switching system and a central office terminal multiplexer/demultiplexer switching system, said switching systems being coupled together via a transmission line, said digital loop carrier system comprising:
   a plurality of remote terminal interface circuits, each one of such circuits corresponding to one of the plurality of subscribers and being adapted for coupling between said subscriber and said remote terminal multiplexer/demultiplexer switching system;
   a plurality of central office terminal interface circuits, each one of such circuits corresponding to one of the plurality of subscribers and having a first pair of terminals adapted for coupling to a DC voltage source provided at said central office and a second pair of terminals adapted for coupling to said central office terminal multiplexer/demultiplexer switching system, each one of said central office terminal interface circuits comprising:
      (a) a transformer, having a primary winding coupled to said first pair of terminals and a secondary winding, such secondary winding being coupled to said second pair of terminals through a CODEC;
      (b) switch means, responsive to a hook condition signal, such signal providing an indication of the "on/off hook" condition of the corresponding subscriber, such switch means being disposed in parallel with said primary winding, for providing a closed circuit between said first pair of terminals to "sink" Dc current provided by the DC voltage source when said signal indicated an "off hook" condition in the corresponding subscriber; and
      (c) means, serially coupled with the primary winding between the first pair of terminals, for preventing DC current provided by the DC voltage source from passing through the primary winding.

9. The digital loop carrier system recited in claim 8 wherein said DC current preventing means comprises a capacitor.

10. The digital loop carrier system recited in claim 8 wherein said switch means includes an optoelectronic device.

11. A telephone communication interface circuit configurable for sue as a central office terminal interface circuit or as a remote terminal interface circuit, said telephone communication interface circuit comprising:
   a first pair of terminals;
   a second pair of terminals;

a third pair of terminals, coupled to said second pair of terminals through a CODEC;

a first circuit path including:
(a) a transformer, having a primary winding and a secondary winding;
(b) switch means, disposed in parallel with said primary winding, for providing a closed circuit between said first pair of terminals in response to a hook condition signal; and
(c) means, serially coupled with the primary winding, for preventing DC current from passing through the primary winding;

a second circuit path comprising a subscriber line interface circuit; and means for selectively coupling either said first circuit path between said first and third pairs of terminals when said circuit is configured as a central office terminal interface circuit or said second circuit path between said first and third pairs of terminals when said circuit is configured as a remote terminal interface circuit.

12. The telephone communication interface circuit recited in claim 11 wherein said transformer includes a pair of primary windings and the DC current preventing means includes a capacitor.

13. A telephone communication interface circuit for transmitting and receiving analog voice and/or digital data information configurable for use as a central office terminal interface circuit or as a remote terminal interface circuit, said telephone communication interface circuit comprising:

a first pair of terminals adapted for coupling to a DC voltage source provided at a central office when said circuit is configured as a central office terminal interface circuit and adapted for coupling to a subscriber when said circuit is configured as a remote terminal interface circuit;

a second pair of terminals adapted for coupling to a central office terminal multiplexer/demultiplexer switching system when said circuit is configured as a central office terminal interface circuit and adapted for coupling to a remote terminal multiplexer/demultiplexer switching system when said circuit is configured as a remote terminal interface circuit;

a third pair of terminals, coupled to said second pair of terminals through a CODEC;

a first circuit path including:
(a) a transformer, having a primary winding and a secondary winding;
(b) switch means, responsive to a hook condition control signal and disposed between said first pair of terminals, for providing a closed circuit between said first pair of terminals to "sink" DC current provided by the DC voltage source when said control signal indicates an "off hook" condition in said subscriber; and
(c) means, serially coupled with the primary winding between the first pair of terminals, for preventing DC current provided by the DC voltage source from passing through the primary winding;

a second circuit path comprising a subscriber line interface circuit, such second circuit path being disposed in parallel with said first circuit path; and means for selectively coupling either said first circuit path between said first and third pairs of terminals when said telephone communication interface circuit is configured as a central office terminal interface circuit or said second circuit path between said first and third pairs of terminals when said telephone communication interface circuit is configured as a remote terminal interface circuit.

14. The telephone communication interface circuit recited in claim 13 wherein said transformer includes a pair of primary windings and the DC current preventing means includes a capacitor.

15. A central office terminal interface circuit having a first pair of terminals and a second pair of terminals, said interface circuit comprising:
(a) a transformer, having a primary winding coupled to said first pair of terminals and a secondary winding coupled to said second pair of terminals;
(b) switch means, coupled in parallel with said primary winding of the transformer, for providing a closed circuit between said first pair of terminals in response to a hook condition signal; and
(c) a CODEC coupled between said secondary winding and said second pair of terminals.

16. The central office terminal interface circuit recited in claim 1 wherein said switch means comprises optoelectronic device responsive to said hook condition signal.

17. The central office terminal interface circuit recited in claim 16 further comprising a field effect transistor having a drain electrode, a gate electrode, and a source electrode, wherein said drain and source electrodes are coupled in parallel with said primary winding and said gate electrode is coupled to said optoelectronic device.

18. A central office terminal interface circuit having a first pair of terminals adapted for coupling to a central office and a second pair of terminals adapted for coupling to a central office terminal multiplexer/demultiplexer switching system, said central office terminal multiplexer/demultiplexer system being coupled, via a digital transmission line and a remote terminal multiplexer/demultiplexer switching system, to a remote terminal interface circuit, said central office terminal interface circuit comprising:
(a) a transformer, having a primary winding coupled to said first pair of terminals and a secondary winding coupled to said second pair of terminals; and
(b) switch means, coupled in parallel with said primary winding, for providing a closed circuit between said first pair of terminals in response to a hook condition signal generated by said remote terminal interface circuit.

* * * * *